United States Patent Office 3,636,130
Patented Jan. 18, 1972

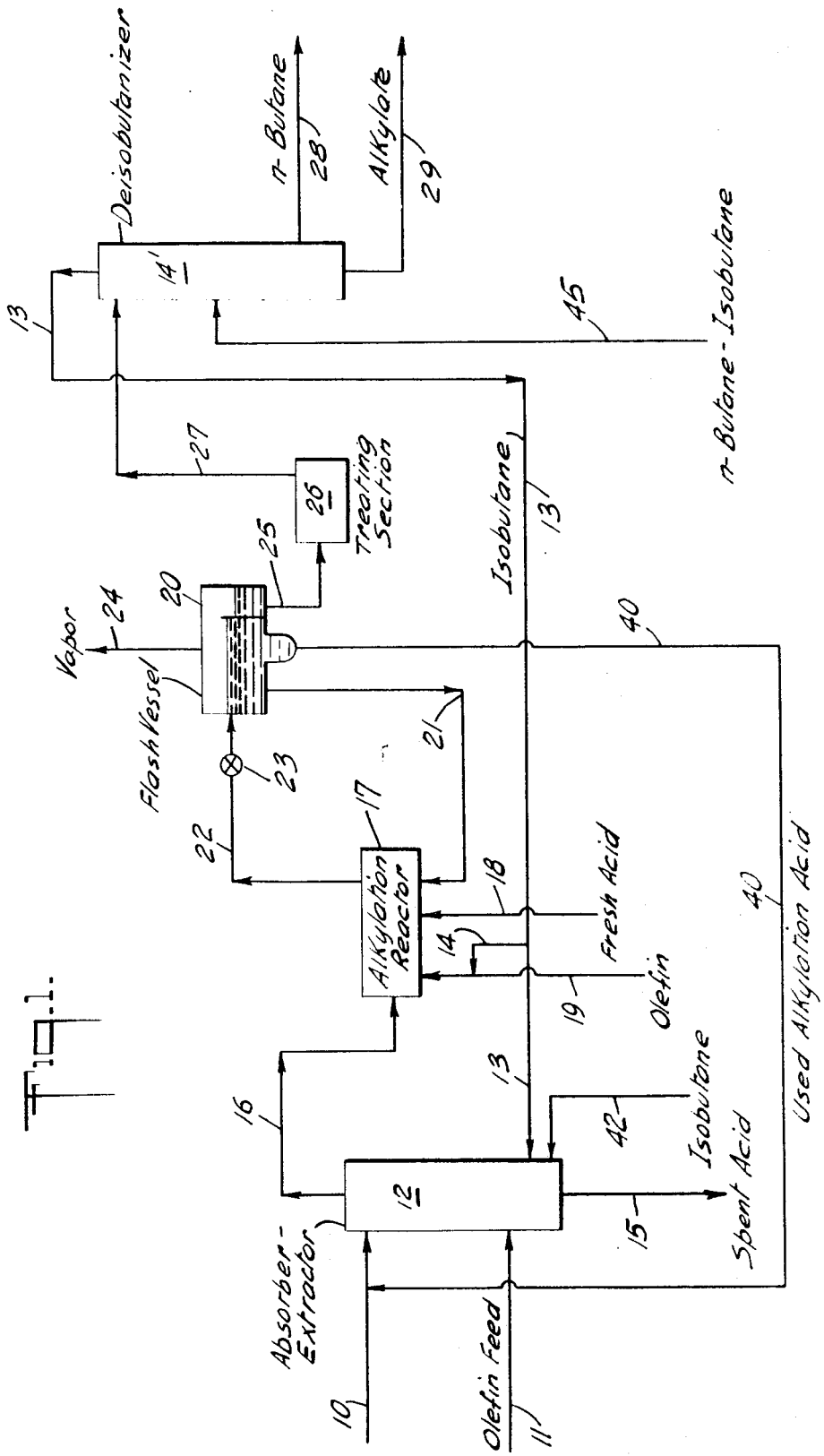

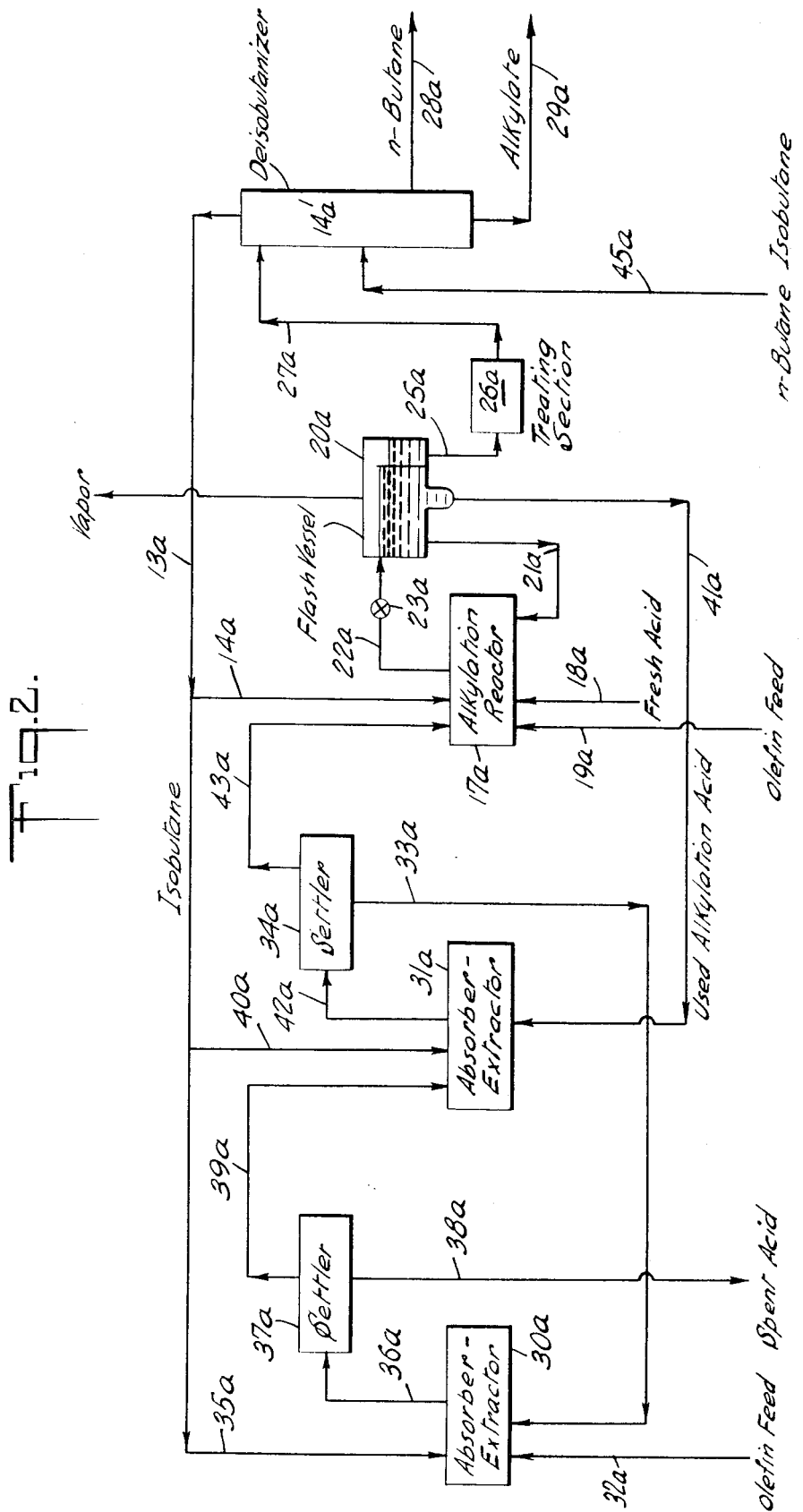

3,636,130
ALKYLATION PROCESS UTILIZING SIMULTANEOUS ABSORPTION AND EXTRACTION OF DIALKYL SULFATES
James O. Francis, Houston, Tex., and Arthur R. Goldsby, Chappaqua, N.Y., assignors to Texaco Inc., New York, N.Y.
Continuation-in-part of application Ser. No. 602,258, Dec. 16, 1966. This application Apr. 30, 1970, Ser. No. 33,524
Int. Cl. C07c 3/54
U.S. Cl. 260—683.62
5 Claims

ABSTRACT OF THE DISCLOSURE

Combination sulfuric acid alkylation-acid recovery process wherein olefin feed is reacted with used alkylation acid in the presence of alkylatable isoparaffin hydrocarbon to produce alkyl sulfates which are simultaneously extracted by the alkylatable isoparaffin and the extract solution passed to the alkylation zone.

CROSS-REFERENCES TO RELATED APPLICATION

This application is a continuation-in-part of copending application Ser. No. 602,258, filed Dec. 16, 1966 and now abandoned.

BACKGROUND OF THE INVENTION

Field of the invention

This invention is directed to improvements in the recovery of sulfuric acid used in chemical reactions. More particularly, it is directed to improvements in the recovery of used sulfuric acid catalyst from the alkylation of olefin-based material with lower isoparaffin hydrocarbons.

Description of the prior art

During the alkylation process, side reactions take place which result in the production of polymeric oil, or unsaturated hydropolymer comprising cyclic conjugated dienes, which reacts with concentrated sulfuric acid to produce undesired acid-polymeric oil complex. This complex is insoluble in hydrocarbons but is soluble in excess acid and therefore remains in the sulfuric acid catalyst. This acid-polymeric oil complex is generally described as alkylation contaminants. Some water is also formed as a by-product of the alkylation reactions. Unless the alkylation contaminants and water are removed from the system substantially as rapidly as they are formed there will be a build up of these substances to such an extent in the acid catalytic activity of the sulfuric acid for promoting the desired alkylation reaction is impaired or destroyed. In order to prevent this destruction of catalytic activity, a small amount of alkylation system catalyst, known as used alkylation acid, is continuously withdrawn at a rate adjusted to remove the contaminants as fast as they are formed, while maintaining a desired acid strength. The withdrawn catalyst contains the same percentage of alkylation contaminants and water and has the same acid strength as the acid remaining in the system. Used alkylation acid is, therefore, an active catalyst for bringing about the alkylation of an olefin with an isoparaffin. In the basic so-called sulfuric acid recovery process with which the present invention is concerned, the used acid withdrawn from the alkylation system is reacted with olefin to bring about conversion of the free acid to products which can be separated from the alkylation contaminants. When the olefin-acid reaction (also called "absorption") is conducted in the liquid phase, the resulting reaction mixture comprises two phases which can be separated from each other on the basis of specific gravity. One is a hydrocarbon phase and the other an acidic phase. The upper or lighter phase comprises an unreacted hydrocarbon and a minor proportion of the total dialkyl sulfates formed during the reaction. The lower and heavier acidic phase comprises a major portion of the a dialkyl sulfates formed, as well as substantially all of the monoalkyl sulfates, alkylation contaminants, free acid and water which may be present.

In prior practice, the acid phase then has been extracted with a light hydrocarbon, with isobutane being the preferred solvent since isobutane is one of the reactants in the alkylation system. The hydrocarbon solvent extracts substantially all of the dialkyl sulfates from the acid phase. The raffinate or residual acid phase customarily is discarded although it may be further processed if desired. The hydrocarbon-dialkyl sulfate extract solution is passed to the alkylation zone where the alkyl portion of the dialkyl sulfate is alkylated with accompanying regeneration of anhydrous 100% sulfuric acid directly in the alkylation system.

When an olefin, such as propylene, butylenes or amylenes, is brought into contact with an alkylatable isoparaffin, such as isobutane, in the presence of concentrated sulfuric acid under alkylation reaction conditions of temperature and pressure, the olefin and isoparaffin will react with the formation of alkylation products. However, if contacting conditions in the reaction zone are not adequate the alkylate product thus formed is of low quality and alkylation contaminants are formed at an accelerated rate. Conditions in an olefin absorber are not conducive to the formation of high quality alkylate. It has been the practice, therefore, to avoid the presence of alkylatable isoparaffin in the olefin absorber and to restrict alkylation reactions to the alkylation zone where conditions are favorable for the formation of high quality product.

THE INVENTION

In accordance with the present invention, certain improvements in a sulfuric acid recovery process operated in conjunction with an olefin-isoparaffin alkylation process are effected and superior results obtained by reacting alkylatable olefin hydrocarbon with catalytically active used sulfuric acid alkylation catalyst in the presence of alkylatable isoparaffin hydrocarbon to form alkyl sulfates to the substantial exclusion of alkylation products and with minimal formation of acid contaminants. Concurrently, dialkyl sulfates thus formed are extracted from the acidic phase by solution in the alkylatable isoparaffin solvent, which solution is withdrawn from the absorption-extraction vessel and passed to the alkylation zone. In accordance with the invention, alkylation of the alkylatable isoparaffin with the olefin does not occur due to substantially instant dilution of the used alkylation acid catalyst to below the concentration required for catalytic activity. This is accomplished by conducting simultaneous absorption of the olefin and extraction of the resulting dialkyl sulfate under countercurrent flow conditions, as in a packed tower, bubble cap tower, Rotating Disc Contactor or other such apparatus, with rapid diffusion of the acid as it enters the absorber-extractor device. Thus, in the present application, the step of reacting the used acid withdrawn from the alkylation system with olefin for the formation of alkyl sulfates and the step of extracting the dialkyl sulfates from the resulting hydrocarbon phase are combined in one single operation rather than as two separate operations. In accordance with the present invention these two steps are conducted simultaneously and successfully in a single vessel using an alkylatable isoparaffin as the solvent for the dialkyl sulfates without encountering alkylation of the olefin or alkyl sulfates with the isoparaffin solvent, even though the used acid charged to the reaction zone is a highly active alkylation catalyst.

Thus, in accordance with the present invention, the alkylatable isoparaffin solvent is charged to the olefin-acid reaction zone in the absorber in sufficient quantity to extract dialkyl sulfate from the acid phase in the absorber. As a result, the hydrocarbon phase of the absorber effluent contains a major portion of the total alkyl sulfates formed and only a minor amount, if any, remains in the acid phase. This is the reverse of the alkyl sulfate distribution normally obtained in the effluent streams from the olefin absorption systems of the prior art.

The introduction of an alkylatable isoparaffin such as isobutane into the absorber as a solvent without having it also become a reactant is possible only because the acidity of the used acid in every portion of the absorber is reduced below the strength at which the acid becomes an active alkylation catalyst. Conditions in the absorber are controlled such that the titratability acidity of the acid in the absorber is reduced to below about 85% $H_2SO_4$ and preferably below about 50% $H_2SO_4$. This is accomplished by operating in a manner to dilute immediately the incoming acid charge to the absorber with reaction mixture containing dialkyl sulfates before the acid can come into contact with unreacted olefin in the presence of isobutane.

Olefin and isobutane streams enter the absorber system at the same end and, if desired, can even be premixed. Countercurrent flow of these hydrocarbons and the used acid is employed in the absorber system. In this manner the strong acid charged at one end of the system is diluted before meeting unreacted olefin and reaction of the diluted acid with olefin further reduces the strength of the acid below that necessary for alkylation of olefin with isobutane.

Specific conditions which are advantageous in the absorber-extractor system include the use of a mole ratio of isobutane solvent to dialkyl sulfate in excess of three, to above six or higher. Under these conditions an appreciable quantity of monoalkyl sulfates also may be extracted, which is not achieved with the prior art systems. A stoichiometric excess of olefin with respect to acid is desirable but a large excess is not required. Liquid phase operation is essential.

Prior to the present invention it has been the practice to avoid the presence of alkylatable isoparaffin in the olefin absorber and there is no teaching in the prior art to specifically introduce an alkylatable isoparaffin hydrocarbon into the absorption zone. While a refinery olefin stream practically never consists entirely of pure olefin and therefore does contain associated paraffinic hydrocarbons of a similar boiling range, for all practical purposes the quantity of such paraffinic hydrocarbons is insufficient to extract a major portion of the dialkyl sulfates from the rich acid phase in the absorber. In the past it has not been taught to deliberately add an additioinal quantity of any paraffin hydrocarbon to the absorber because at best even a non-alkylatable paraffin hydrocarbon acts as a diluent to affect adversely the absorption reaction and to overload the capacity of the absorber vessel. Furthermore, as pointed out hereinbefore, in the presence of concentrated sulfuric acid, such as used alkylation acid, olefins react with alkylatable isoparaffin to produce alkylate which is of poor quality unless the reaction is conducted under substantially ideal conditions. Such conditions do not exist when reacting olefin with acid to produce alkyl sulfates. When operating in accordance with the present invention it has been found that the introduction of isoparaffin solvent into the olefin absorber advantageously affects the equilibrium of the olefin-acid reaction. Continuous solution of dialkyl sulfates into the solvent phase greatly facilitates the formation of dialkyl sulfates as the product of the reaction.

Refinery olefin streams charged to the olefin absorber in alkylation systems having such absorber contain only relative insignificant quantities of isoparaffin hydrocarbons. It is refinery practice to remove isoparaffins from the olefins completely as possible if the olefin stream is to be reacted with sulfuric acid, the reason being that the reaction of isobutane with olefin in an olefin absorber yields very inferior motor fuel components, as compared with the products obtained by charging the isobutane directly to an alkylation unit.

Further, the olefin-acid reaction system must be conducted in the liquid phase when additional hydrocarbon is introduced to act as a solvent for the dialkyl sulfates formed. While gaseous propylene-containing streams containing small quantities of olefin, such as polymerization unit fuel gas, can sometimes be charged to an absorber, the associated non-olefinic gases such as ethane, propane and n-butane if present are not alkylatable and their presence must be kept to a minimum in the alkylation system. Therefore, if such gases are employed in a system operated in the manner of the present invention it is desirable to incorporate an additional step to remove inert hydrocarbons from the extract solution.

A hydrocarbon introduced into an absorber to act as a solvent for dialkyl sulfates, must be alkylatable if the extract solution is to be passed in total to an alkylation zone. Otherwise the hydrocarbons act as diluents and the alkylation reaction is impaired. Prior to the present invention it has been the practice to avoid charging an alkylatable isoparaffin hydrocarbon to an olefin absorber for any purpose.

The advantages of our invention include a savings in investment and operatings costs, higher yield of recovered acid, with a resulting lower net acid consumption in alkylation, higher recovery or yield from olefin charge, complete utilization of all olefin charge, efficient drying of an increased proportion of alkylation charge stocks, improved flexibility in the refrigeration of the absorber, the improved separation of organic and acidic phases in absorption-extraction step.

Having set forth the general nature of the invention, it will be best understood from the following more detailed description and accompanying drawing. Although the drawings illustrate arrangements of apparatus in which the process of this invention can be practiced, it is not intended to limit the invention to the particular apparatus or materials described. Obviously, the invention can be applied using other contacting devices for the absorption section, and it can be applied to other alkylation systems, for example, those using effluent refrigeration and cascade autorefrigeration. In the accompanying drawings, like numerals are employed to designate like parts:

FIG. 1 shows the invention with a single countercurrent tower for the absorption-extraction step in conjunction with an alkylation unit using emulsion flashing refrigeration, and FIG. 2 shows the invention with a two vessel countercurrent absorption-extraction step in conjunction with an alkylation unit using emulsion flashing refrigeration.

Referring to FIG. 1, used alkylation acid is charged through lines 40 and 10 to absorber-extractor vessel 12 near the top of this vessel under liquid phase conditions. The used acid is introduced under conditions such that it immediately becomes converted to or becomes diluted with alkyl sulfates and the concentration of $H_2SO_4$ is reduced below catalytic strength. Isobutane from deisobutanizer 14' is cooled and charged through line 13 to absorber-extractor vessel 12 near the bottom of this vessel. Olefin is charged to absorber-extractor vessel 12 through line 11 at a point intermediate to lines 10 and 13 and preferably relatively closer to the bottom of the vessel. Absorber-extractor vessel 12 is preferably a multi-stage countercurrent contacting device such as a packed tower, bubble cap tower or a Rotating Disc Contactor. Spent acid is discharged from the bottom of absorber-extractor vessel 12 through line 15. This spent acid has a relatively low acidity and comprises alkylation contaminants, such as acid-polymeric oil complex, water, alkyl acid sulfates and a minor quantity of dialkyl sulfate in varying amounts depending upon the efficiency of the extraction.

The overhead or isobutane extract from absorber-extractor vessel 12 containing a major portion of the alkyl sulfates formed is passed through line 16 to alkylation reaction 17 to which is added olefin via line 19, fresh acid via line 18, additional isobutane through lines 13 and 14 and cooled acid-hydrocarbon emulsion through line 21 from flash-vessel 20. In reactor 17 alkylation of olefins and also alkyl sulfates with isobutane and the liberation of 100 percent sulfuric acid from the alkyl sulfates is effected.

Alkylation reaction mixture comprising an acid-hydrocarbon emulsion and alkylation contaminants is passed through line 22 and pressure reduction valve 23 to flash vessel 20. Flashing takes place in flash vessel 20 with resulting cooling of the vapor and liquid.

The vapor overhead from vessel 20 is passed through a compression, depropanization and flashing system, not shown, by which propane is eliminated from the system and a cold, concentrated isobutane stream by means not shown is returned to alkylation reactor 17, or, if desired, to absorber-extractor 12.

Separated hydrocarbon comprising isobutane and alkylate is passed through line 25 to conventional treating section 26. Treated hydrocarbon is passed through line 27 to deisobutanizer 14. Isobutane is taken off through line 13, and n-butane off through line 28 as a side stream. Additional isobutane feed is charged to deisobutanizer 14' through line 45. The desired alkylate product is taken off through line 29.

Although an isostripper type fractionator 14' is shown in which reflux is furnished by introducing the fresh feed near the top of the tower, other conventional fractionation schemes can be used. Also, a depropanizer, not shown, is usually used in conjunction with the rest of the fractionation equipment to discharge propane from the system.

Referring to FIG. 2, the absorber-extractor stages 30a and 31a are agitated or stirred vessels requiring associated settlers 37a and 34a, respectively, for separation of the organic and acidic phases. Back-mixing occurs in the vessels. Counter flow of the olefin as well as the olefin feed is obtained by the flow between the two vessels 30a and 31a, although not to as great an extent as may be obtained with a multi-stage countercurrent tower, as in FIG. 1. More than two vessels corresponding to vessels 30a and 31a can be used to enhance the countercurrent effect.

Fresh olefin feed through line 32a and partially converted acid from settler 34a through line 33a are charged to absorber-extracting 30a along with isobutane from deisobutanizer 14'a after cooling, through lines 13a and 35a. In asborber-extractor 30a the partially converted acid from settler 34a still containing a large amount of mono-alkyl sulfate is converted almost completely to dialkyl sulfate with excess of olefin present. The effluent from absorber-extractor 30a is passed through line 36a to settler 37a in which stratification into a lower acidic phase and an upper organic phase takes place. The acidic phase comprising alkylation contaminants is discharged as spent acid from the system through line 38a. The organic phase comprising isobutane, alkyl sulfates and unreacted olefin is passed from settler 37a through line 29a to absorber-extractor 31a along with isobutane from deisobutanizer 14'a, after cooling, through lines 13a and 40a, and used alkylation acid of about 90 percent titratable acidity through line 41a from flash vessel 20a. In absorber-extractor 31a substantially all of the used alkylation acid is converted to alkyl sulfates, although a good portion is in the mono-alkyl sulfate form, or is only partially converted.

The effluent from absorber-extractor 31a is passed through line 42a to settler 34a in which stratification into a lower acid phase and an upper organic phase takes place. The acidic phase, as previously mentioned, comprising partially converted acid is passed to absorber-extractor 30a through line 31a. The upper organic phase comprising isobutane, alkyl sulfates and unreacted olefin is passed from settler 34a through line 43a to alkylation reactor 17a along with olefin feed through line 19a, fresh acid through line 18a, isobutane through lines 13a and 14a, and used alkylation acid of about 90 percent titratable acidity through line 21a from flash vessel 20a. In alkylation reactor 17a alkylation of alkyl sulfates and olefins with isobutane and the liberation of 100 percent sulfuric acid takes place.

Alkylation reaction mixture comprising an acid-hydrocarbon emulsion and alkylation contaminants is passed through line 22a and pressure reduction valve 23a to flash vessel 20a. Flashing takes place in flash vessel 20a with resulting cooling of the vapor and liquid.

The overhead from vessel 20a is passed through a compression, depropanization and flashing system, not shown, by which propane is eliminated from the system, and a cold, concentrated isobutane stream, by means not shown, is returned to alkylation reactor 17a, or, if desired, to absorber-extractor 30a and 31a.

Separated hydrocarbon comprising isobutane and alkylate is passed through line 25a to conventional treating section 26a. Treated hydrocarbon is passed through line 27a to deisobutanizer 14'a. Isobutane is taken off through line 13a, and n-butane off through line 28a as a side stream. The desired alkylate product is taken off through line 29a.

DESCRIPTION OF A PREFERRED EMBODIMENT

Using the flow of FIG. 1, wherein absorber-extractor vessel 12 is a countercurrent tower packed with Raschig rings, 4,666 pounds per hour of flat, used alkylation acid at 20° F. titrating 90.0 percent by weight sulfuric acid is charged to tower 12 near the top thereof through line 10 via line 40 from flash vessel 20. Near the bottom of tower 12 through line 13 is charged 4,000 pounds per hour of isobutane from deisobutanizer 14', and above the isobutane entry point is charged 6,666 pounds per hour of a propane-propylene feed containing 60% of propylene through line 11. The propylene reacts with the used alkylation acid in the tower to form 6,669 pounds per hour of diisopropyl sulfate. The tower is operated in the liquid phase at 60 p.s.i.g. and 50° F. the diisopropyl sulfate is extracted by the isobutane introduced through line 10 and the overhead stream from tower 12 comprising isobutane and diisopropyl sulfate is passed to alkylation reactor 17 through line 16 along with additional isobutane through lines 13 and 14. 711 pounds per hour of fresh 99.5% sulfuric acid is charged to reactor 17 through line 18 and 27,234 pounds per hour of a butane-butylene feed containing 60% of butylenes through line 19. The alkylation reaction is run in conventional manner in the liquid phase at 40° F. with efficient mixing. Alkylation reaction mixture is passed to flash vessel 20 through line 22 and pressure reduction valve 23 wherein flashing occurs. Vapor is taken off through line 24, and after compression and cooling is charged to a depropanizer not shown. The bottoms from the depropanizer a the rate of 8,000 pounds per hour, after cooling and flashing, comprising mainly isobutane at 20° F., and charged to absorber-extractor 12 through line 42. As previously indicated, cold, flat acid at 20° F. from flash vessel 20 is charged to absorber-extractor 12 through lines 40 and 10. Cold acid-hydrocarbon emulsion or "wild acid" from flash vessel 20 is recycled to alkylation reactor 17 through line 21.

The hydrocarbon phase comprising alkylate and isobutane is passed from flash vessel 20 through line 25 to conventional treating section 26, along with field butanes through line 45, and then to deisobutanizer 14'. A side stream of n-butane is taken off through line 28, and recycle isobutane for alkylation reactor 17 and absorber-extractor 12 through line 13.

The desired alkylate product at the rate of 41,358 pounds per hour or approximately 4,000 barrels per day is removed as bottoms from deisobutanizer 14 through line 29.

The fresh acid addition of 711 pounds per hour of 99.5% sulfuric acid corresponds to an acid consumption of approximately 0.1 pound per gallon of alkylate. An equivalent amount of weak acidic material is discharged as raffinate from the bottom of absorber-extractor 12 through line 15 in the amount of 1,180 pounds per hour. It comprises alkylation contaminants such as acid-oil complex and water, and alkyl sulfates.

The alkylate product has a 90% point of 260° F., an end point of 380° F., a Research Octane clear of 95.0 and a Research Octane with 3.0 cc. TEL of 107.5.

ABSORPTION-EXTRACTION

In the absorption-extraction step propylene is preferred as the olefin feed stock, although higher molecular weight olefins can be used, especially the butylenes and amylenes. A stoichiometric excess of olefin to form dialkyl sulfate is advantageous, although the excess does not have to be very great when using our invention, especially when using countercurrent flow.

Liquid phase conditions for the extracting hydrocarbon are essential, otherwise the extracting hydrocarbon would be removed as vapor from the absorber-extractor vessel.

Conversion of sulfuric acid to dialkyl sulfate is accelerated by simultaneously absorbing olefin in the acid and extracting dialkyl sulfate as rapidly as it forms. Since the hydrocarbon present extracts the dialkyl sulfate as it forms, the dialkyl sulfate in effect is removed from the acid-olefin reaction mixture. The result is that not only is the reaction to form dialkyl sulfate accelerated, but, in addition, a greater percentage of the acid and alkyl acid sulfate are converted to dialkyl sulfate.

Cooling can be effected by using charge streams to the absorber cooled to a temperature below the absorber reaction temperature, for example, the used acid or emulsion from the emulsion flashing alkylation operation of FIGS. 1 and 2. Cold isobutane at about 20° F. or lower, which can be obtained from alkylation reaction mixture, and hydrocarbon can be used for direct injection to the absorber not only for extraction of the alkyl sulfates but for cooling.

Used alkylation acid having a titratable acidity of about 88–90% by weight, is the preferred acid charge stock for the absorption step, although in some cases, for example, if amylenes are being alkylated, the acid can have a concentration as low as 80–85%. Acid from other sources, such as fresh acid, or acid from chemical reactions, and acid from the acid treatment of petroleum naphtha or lube oil can also be used for at least part of the acid charge stock. It is important that the acid in the absorption-extraction zone be below alkylation strength of about 85% titratable acidity required for the catalytic alkylation of olefins with isobutane. The conditions existing in a counterflow tower operated in accordance with the present invention make it impossible to have acid present having a concentration of $H_2SO_4$ above alkylation strength. In addition, certain other essential alkylation conditions are not present, such as efficient mixing, and high rate of acid or emulsion recycle.

The strength of the incoming strong acid is reduced below alkylation strength substantially immediately in the vicinity of the point of input by several methods. A portion of the extract solution stream consisting of hydrocarbon and dialkyl sulfate, absorber-extractor reaction mixture, or acid phase from a lower portion of the tower can be mixed with the incoming strong acid prior to its entry into the tower to ensure that the acid is below alkylation strength. As an alternative, a suitable mixing device, such as a diffuser plate, or a mixing orifice can be used to mix incoming strong acid with reaction mixture containing alkyl sulfates to dilute immediately the acid to a strength below alkylation strength before it comes into contact with olefin. Under the conditions of excess olefin and relatively strong acid in the final stages of extraction in a tower, the acid reacts with olefin with the result that its acidity is reduced drastically and quickly. When using two mechanically stirred reactors with the used acid charged in series thereto, such as shown in FIG. 2 for absorption-extraction, the acidity in the reactors is always quite low and probably there is no detectable free sulfuric acid at all present at the point of olefin feed.

When using alkylation strength acid with propylene as the olefin, a temperature of 20–60° F. for the reaction of the olefin with the acid is satisfactory. When butylenes are used, especially isobutylene or isobutylene-containing charge stocks, lower temperatures and shorter residence times are advantageous. However, since diisopropyl sulfate is much more soluble in hydrocarbon solvents above about 35° F., a temperature in the absorber of about 40–60° F. is preferred, at least in the later extraction stages. In order to favor both the extraction and absorption, especially when processing butylenes, a lower temperature can be used in the lower part of the absorber-extractor tower, for example, 0° F. or lower, and a higher temperature in the upper part of the tower, for example, 35° F. or higher. It is especially important to have the lower temperature in the bottom of a countercurrent tower when an isobutylene containing stock is used.

Olefin stocks having a relatively high olefin content, such as those from catalytic cracking, are preferred. From an economic standpoint lean stocks such as lean propylene stock having only approximately 10% of propylene or less can be handled advantageously and satisfactorily. When using a lean stock, the propane present can be used as the solvent for extraction of the dialkyl sulfates. In such a case it is desirable to remove at least a portion of the propane before charging the propane-dialkyl sulfate extract to the alkylation reactor. Advantageously, this propane can be removed by passing the extract stream in indirect heat exchange with the reaction mixture of the absorber-extractor.

The extraction absorption step can be effected in contacting equipment well known in the art, for example, mixer-settlers centrifugal contactors, countercurrent towers or two or more mechanically stirred reactors opeating to give countecurrent flow. Multi-stage countercurrent contacting is preferred in order to obtain a high conversion of the acid to dialkyl sulfates and a high degree of extraction of the alkyl sulfates.

In general, it is easier to extract the dialkyl sulfate than the alkyl acid sulfate. Thus, it is desirable to use quite good and efficient conditions in the extraction step so as to extract not only the dialkyl sulfate, but also the alkyl acid sulfate. A mole ratio of hydrocarbon solvent to alkyl sulfate in excess of three and preferably above six or higher is advantageous. The higher solvent dosage not only enables the extraction of more of the desired alkyl sulfates, but it also results in a cleaner and quicker separation between the acidic and organic phases.

The raffinate or spent acid from the extraction step comprises water, alkyl acid sulfate, dialkyl sulfate and the reaction product of acid and polymeric oil formed during the alkylation, absorption, and acid treating steps. The extract comprises the hydrocarbon solvent, dialkyl sulfate, and a limited amount of alkyl acid sulfate.

Any polymeric oil contaminant in the dialkyl sulfate extract solution is quite unsaturated and reacts readily with strong sulfuric acid, such as fresh make-up acid used for the alkylation step, or used alkylation acid, of about 90% concentration. Thus, if desired, the dialkyl sulfate extract solution can be acid treated prior to charging it to alkylation, and optionally after removal of any unreacted olefin it may contain, as when an excess of olefin is charged to the absorber-extractor. For example, quite good results have been obtained by acid treating polymeric oil in isobutane solution with used alkylation acid of about 90% concentration at a temperature of 85° F. and a time as long as one hour. However, a temperature not over about 40–60° F. and a short time on the order of a few minutes or less are preferred. Actually, a very short time such as in the mixing obtained with a pressure drop orifice appears to be satisfactory.

ALKYLATION

In general, the conditions for the alkylation step are those which are well known in the art. However, the bulk of the make-up acid is charged to alkylation as alkyl sulfates which result from the recovery section, and only a minor proportion of the acid is charged as the fresh make-up acid of the usual 98–99.5% concentration. Since the alkyl sulfates are substantially water free, the system catalyst, when using the acid recovery process, has a lower water content and, in general, is of superior quality in that a lower end point alkylate of higher octane value is obtained. Alternatively, if desired, less drying of charge stocks can be employed, and in such a case the water content of the system catalyst can be as high as in conventional operation without acid recovery. The sulfuric acid in the alkylation system is usually maintained within a range of about 88–95% by purging spent acid from the system. In a multiple reactor system the acid of the lowest concentration is purged and sent to the acid recovery system.

A large excess of isobutane is used in the alkylation reactor, for example, as much as 60–80 volume percent of the hydrocarbons in the alkylation reaction mixture. Consequently, a large quantity of isobutane must be recovered and recycled for reuse in the alkylation process. It is also available for the recovery process as described.

In addition to the olefin charged to the alkylation step in the form of alkyl sulfates, additional fresh olefin usually is also charged to the alkylation step. For example, when propylene and/or butylenes, and especially propylene, are used for the absorption step, it is advantageous to charge additional butylene to the alkylation step.

Fresh make-up alkylation acid of about 98–99.5% concentration acid does not have over about 2.0% of water in it. Consequently, the corresponding used alkylation acid passed to the absorption-extraction step usually does not contain over about 1.0–5% of water, and will usually have a titratable acidity in the range of 80–90%. It is contemplated that fresh acid is used, if desired, for the absorption-extraction step, in which case such acid may have a water content as high as 15–20%, and a titratable acidity as low as about 80%. However, acid with a much lower water content is preferred, for example, not over 5%. Regardless of the strength or titratable acidity of the acid charged to absorption-extraction step, if it is strong enough to react with olefin, in the alkyl sulfate reaction zone the acidity will be reduced well below alkylation strength or below 50% titratable acidity.

In the simplest application of the invention when operated directly in combination with an alkylation unit the used alkylation acid is charged to the absorber for reaction with olefin, and dialkyl sulfate product is charged to alkylation. However, there are many different specific ways in which the invention may be used, for example, because of existing conditions or because of charge stocks, especially when used in combination with an alkylation process in which more than one alkylation unit or reactor is operated.

Obviously, many modifications and variations of the invention, as hereinbefore set forth, may be made without departing from the spirit and scope thereof, and therefore only such limitations should be imposed as are indicated in the appended claims.

We claim:

1. In a process of alkylating a lower isoparaffin hydrocarbon with olefin-based material in the presence of a sulfuric acid catalyst in an alkylation reaction zone wherein said catalyst becomes contaminated with alkylation contaminants, and wherein olefin-containing charge stock is reacted with used sulfuric acid alkylation catalyst in an olefin absorption zone with the formation of alkyl sulfates the improvement which comprises:

charging to said olefin absorption zone under liquid phase countercurrent flow conditions said used sulfuric acid alkylation catalyst and said alkylatable olefin in relative amounts such that the quantity of olefin charged is in excess of two moles of olefin per mole of $H_2SO_4$, concurrently charging to said olefin absorption zone in the vicinity of said alkylatable olefin charge an alkylatable isoparaffin hydrocarbon in an amount such that the quantity of isoparaffin hydrocarbon is in excess of about three moles per mole of dialkyl sulfate formed, said countercurrent flow conditions reducing the concentration of said used sulfuric acid alkylation catalyst below catalytic strength upon entry into said absorption zone to less than about 80% $H_2SO_4$ content, separately withdrawing from said olefin absorption zone an organic phase comprising a solution of said dialkyl sulfates in said alkylatable isoparaffin hydrocarbon and an acidic phase comprising alkyl acid sulfates and alkylation contaminants, and passing said organic phase to said alkylation reaction zone.

2. The process of claim 1 wherein the concentration of said used sulfuric acid alkylation catalyst in said absorption zone is less than 50% by weight $H_2SO_4$.

3. A process according to claim 1 in which said alkylatable olefin is selected from the group consisting of propylene, butylenes and amylenes.

4. The process of claim 1 wherein the water content of said used sulfuric acid catalyst in said absorption zone is in the range of 2–20%.

5. The process of claim 1 wherein the concentration of said used sulfuric acid alkylation catalyst is reduced below catalytic strength for alkylation by mixing with dialkyl sulfate formed in said olefin absorption zone by reaction of said alkylatable olefin with said used sulfuric acid alkylation catalyst.

References Cited

UNITED STATES PATENTS

| | | | |
|---|---|---|---|
| 3,227,775 | 1/1966 | Goldsby | 260—683.61 |
| 3,234,301 | 2/1966 | Goldsby | 260—683.61 |
| 3,484,168 | 6/1969 | Goldsby | 260—683.62 |
| 3,442,972 | 5/1969 | Massa | 260—683.62 |
| 3,462,512 | 8/1969 | Goldsby | 260—683.61 |

DELBERT E. GANTZ, Primary Examiner

G. J. CRASANAKIS, Assistant Examiner